Jan. 27, 1959 V. S. MURRAY 2,870,623
SUPPORTED CONCRETE FLOOR AND CONDUITS
Filed Sept. 24, 1957
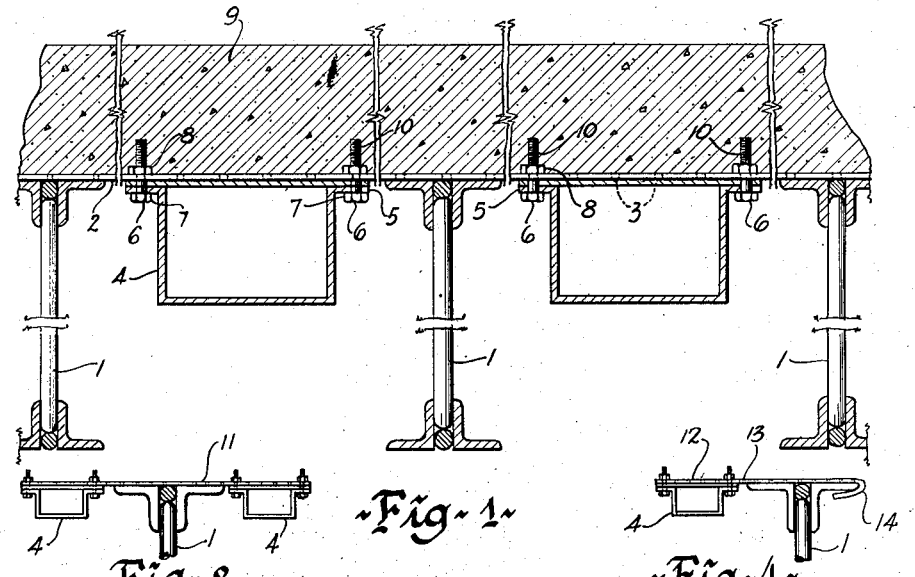
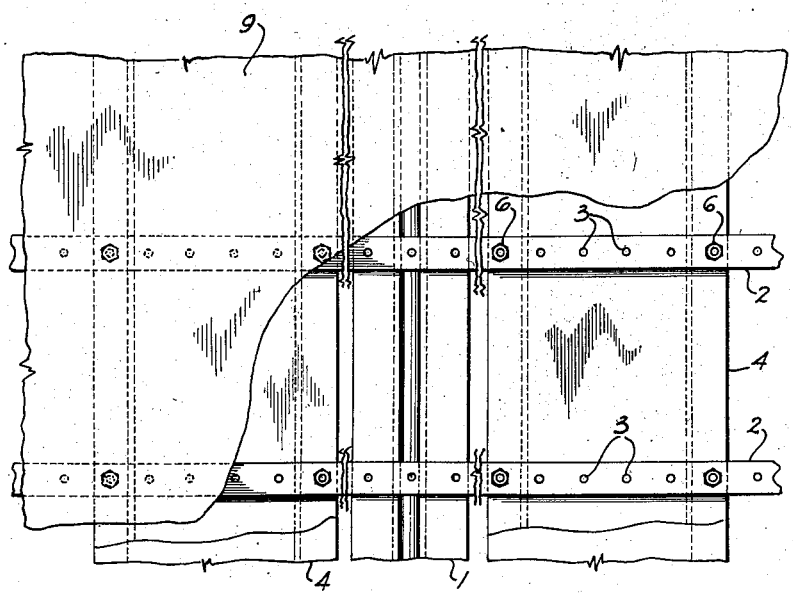
INVENTOR
VICTOR S. MURRAY
BY Alex. E. MacRae
ATTORNEY

United States Patent Office 2,870,623
Patented Jan. 27, 1959

2,870,623
SUPPORTED CONCRETE FLOOR AND CONDUITS

Victor S. Murray, Toronto, Ontario, Canada

Application September 24, 1957, Serial No. 685,837

1 Claim. (Cl. 72—70)

This invention relates to a method and means for attaching wire receiving ducts to floors and the like.

It is common practice to associate electrical and other wire receiving ducts with floors of industrial and commercial buildings. Since such floors are usually formed of cementitious and like materials, it is difficult and expensive to mount therein or suspend therefrom wire receiving ducts which are normally of metal construction.

It is an object of this invention to provide a method and means for suspending a wire receiving duct from a cementitious or like floor in a simple, inexpensive, and satisfactory manner.

To this end, the invention resides in a method of suspending a wire receiving duct from a cementitious floor which comprises laying a plurality of temporary supporting straps transversely of the floor carrying joists, bolting wire receiving ducts to said straps with bolts arranged with their heads disposed below said straps and their free ends disposed above said straps, and pouring said cementitious floor to embed therein said free ends of the bolts and thereby secure said ducts to said floor.

The invention also resides in a wire receiving duct system comprising a cementitious floor, joists carrying said floor; perforated metal straps extending transversely of said joists and seated upon the upper surfaces thereof, wire receiving ducts disposed between said joists, bolts securing said ducts to said straps, said bolts having their heads disposed below said straps and free end portions projecting upwardly beyond said straps, said free end portions of said bolts being embedded in said cementitious floor.

The invention will be described with reference to the accompanying drawing, in which Figure 1 is an end elevation partly in section of a floor duct system in accordance with the invention, Figure 2 is a plan view of the floor duct system, Figure 3 is an end elevation of a slightly modified form of duct system in accordance with the invention, and Figure 4 is an end elevation of a further modified form of duct system in accordance with the invention.

The invention is particularly applicable to the conventional bar joist supported floor which is in widespread use. In the drawing, therefore, conventional bar joists are indicated at 1, associated supporting elements being omitted for clarity of illustration.

In accordance with the invention, a plurality of metal straps 2 with perforations 3 therein are laid upon the upper surfaces of the joists and transversely thereof. Each strap 2 may be standard plumber's strap or its equivalent, which is relatively inexpensive but possesses substantial rigidity. One such standard strap is approximately ¾ inch in width with ¼ inch holes, the centers of which are spaced ½ inch apart.

Wire receiving ducts 4 are now bolted to the straps 2 for suspension therefrom. To this end, each duct is applied to the straps in transverse relation thereto and with the upper flanges 5 of the duct in engagement with the under surfaces of the straps 2. Bolts 6 are passed through the flanges 5 and through the perforations 3 in the straps. The heads 7 of the bolts engage the under surfaces of the flanges 5 and nuts 8 may be employed to secure the bolts in place. Each bolt 6 is of such length that it projects approximately one to two inches above the strap 2. Thus, when the cementitious floor 9 is laid, the upwardly projecting free end portions 10 of the bolts become embedded in the floor and rigidly anchor the ducts 4 thereto.

It will be apparent that, while the conventional plumber's or like strapping from which the straps 2 are formed is readily bendable, nevertheless it does possess sufficient rigidity to temporarily suspend the ducts from the bar joists, and in proper relation thereto.

There has thus been provided a very inexpensive method and means for installing a wire receiving duct system in conjunction with a floor, such duct system being rigidly secured to the floor for satisfactory service.

Referring to Figure 3, a two duct system may be readily mounted on a single bar joist 1 by securing short strips 11 of perforating strapping to a pair of ducts 4, the intermediate portions of the strips 11 being transversely arranged on the bar joist 1 as shown and the assembly slid therealong to desired location thereon.

Referring to Figure 4, a single duct system may be readily mounted on a single bar joint 1 by securing short strips 12 of perforated strapping to a duct 4. Each strip 12 has a projecting portion 13 arranged to extend transversely over the top of the bar joist to which it is secured as by hooking or clamping the end 14 thereof around the bar joist.

I claim:

In a floor duct system for a cementitious floor having bar joists carrying said floor, a plurality of elongated perforated metal straps each in its longitudinal direction extending transversely of said joists and seated upon the upper surfaces thereof, said straps being in spaced, substantially parallel, relation to each other, each said strap having a width of minor extent with respect to its length, wire receiving ducts disposed between said joists and having side flanges, bolts extending through said side flanges and through perforations in said metal straps to secure said ducts to said straps to provide preliminary supports for the ducts prior to pouring the floor, said bolts having heads disposed below said straps and free end portions projecting upwardly beyond said straps, said free end portions of said bolts being embedded in said cementitious floor to form primary supports for the ducts.

References Cited in the file of this patent

UNITED STATES PATENTS

| | | |
|---|---|---|
| 1,087,644 | Crane | Feb. 17, 1914 |
| 1,223,801 | Knox | Apr. 24, 1917 |
| 2,278,822 | Benz | Apr. 7, 1942 |